Nov. 16, 1926.
A. H. SENSENIG
GATE
Filed Feb. 25, 1926
1,607,412
2 Sheets-Sheet 1
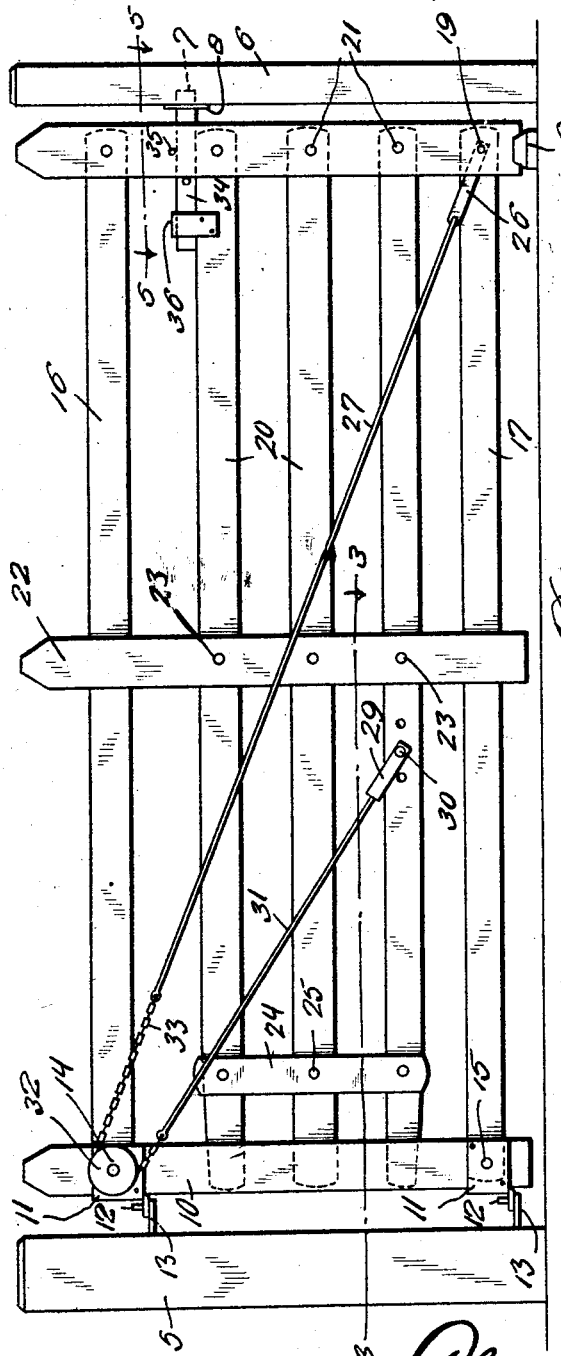
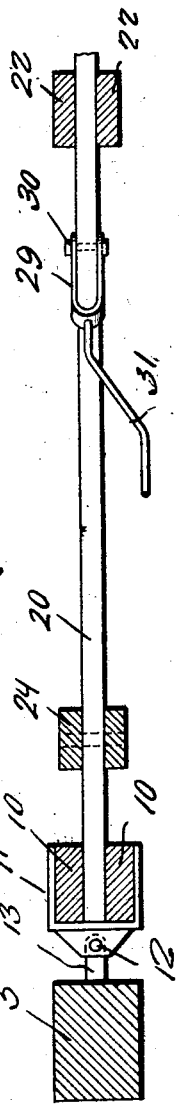
Inventor
A.H. Sensenig,
By Clarence A. O'Brien
Attorney Nov. 16, 1926.
A. H. SENSENIG
GATE
Filed Feb. 25, 1926 2 Sheets-Sheet 2
1,607,412
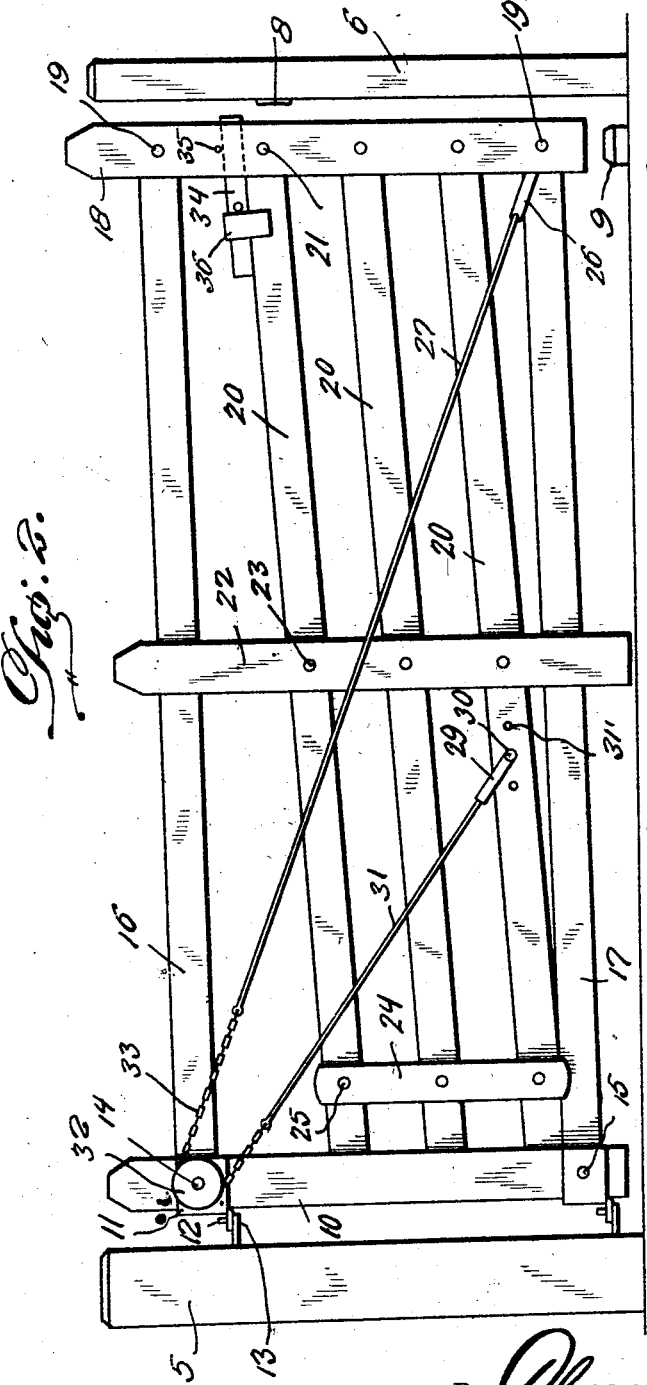
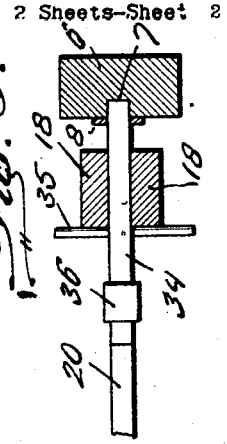
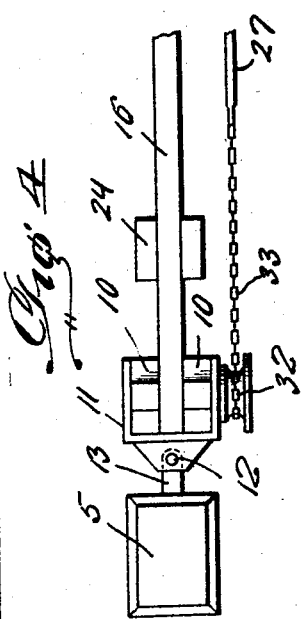
Inventor
A.H. Sensenig,
By Clarence A.O'Brien
Attorney Patented Nov. 16, 1926.

1,607,412

UNITED STATES PATENT OFFICE.

AARON H. SENSENIG, OF MANHEIM, PENNSYLVANIA.

GATE.

Application filed February 25, 1926. Serial No. 90,578.

The present invention relates to a gate and has for its principal object to provide a structure wherein a horizontally swinging gate is provided with means whereby its free end may be raised for clearing a ground keeper and other obstacles located on the ground in the path of the horizontal movement of gate.

Another important object of the invention is the provision of a gate of this nature having balancing means within the confines of its outline for maintaining the gate in a raised or lowered position as desired.

Another very important object of the invention is to provide a gate wherein the longitudinal slot bars are used as balance weights.

A still further very important object of the invention is to provide a gate of this nature which is exceedingly simple in its construction, strong, durable, compact, convenient, reliable, easy to manipulate, and otherwise well adapted to the purpose for which it is designed.

With the above and numerous other objects in view as will appear as the description proceeds, the invention resides in certain novel features of construction and as will be hereinafter more fully described and claimed.

In the drawing:

Figure 1 is a rear elevation of the gate embodying the features of my invention, showing the same in a closed locked position, Fig. 2 is a similar view showing the gate unlocked, and with the free end raised to clear the ground keeper.

Fig. 3 is a horizontal longitudinal section taken substantially on the line 3—3 of Fig. 1, looking downwardly, Fig. 4 is a top plan view of the gate showing that portion which is hinged, and Fig. 5 is a detail section taken substantially on the line 5—5 of Fig. 1, looking downwardly.

Referring to the drawing in detail, it will be seen that the numeral 5 designates one fence post and the numeral 6 the other fence post. The fence post 6 is provided with an opening or depression 7 on the inner face thereof over which is disposed the usual escutcheon 8. A keeper block 9 is located a spaced distance inwardly from the bottom end of the post 6 in alinement with the post 7. The elements thus far described are of conventional construction, or any other suitable formation, and are illustrated in the drawing, merely to bring out clearly the operation and utility of my improved gate.

Referring to the gate in detail, it will be seen that the numerals 10 designate a pair of vertically extending spaced parallel standards mounted in brackets 11 pivoted on hinged ends 12 rising from arms 13 projecting inwardly from the post 5. Pivot pins 14 and 15 pierce the brackets 11 and the standards 10 and have pivoted thereon between the standards longitudinally extending bars 16 and 17 respectively. A pair of vertically extending parallel spaced standards 18 are pivoted by pins 19 to the forward ends of the bars 16 and 17. The standards 10 and 18, and the bars 16 and 17 form the frame of the gate, which, in the present example, is always in the form of a parallelogram.

The numerals 20 designate a plurality of slat bars adapted to extend longitudinally within the frame work just described. Corresponding ends of the bars 20 are pivoted between the standards 18 by pins 21. The other ends of the bars 20 are swingable between the standards 10. A pair of vertically extending spaced parallel standards 22 straddle the intermediate portions of the slat bars 20 and are pivoted thereto by pins 23. The upper ends of these standards 22 straddle the bars 16 and the lower ends thereof straddle the bar 17. A pair of vertically extending parallel spaced standards 24 straddle the slat bars 20 adjacent their free ends a slight distance from the standards 10. These standards 24 are pivoted to the slat bars 20 by pins 25.

The slat bars 20 always extend in parallelism with one another in the present example. A clevis 26 is pivoted on the lower pin 19 and has attached thereto a rod 27. A clevis 29 is pivoted on a pin 30 projecting through one of the openings 31 in the bottom slat bar 20 between the standards 22 and 24, said openings being disposed closer to the standards 22 than the standards 24.

A rod 31 is engaged with the clevis 29. A pulley 32 is journaled on the pin 14 and a chain or other flexible member 33 is trained thereover and attached at its ends to the ends of the rods 27 and 31.

A bolt 34 is slidable on the upper edge of the top slat bar 20 between the standards 18, a guide pin 35 being provided in said standard, and a sleeve 36 being attached to said upper slat bar for receiving the bolt. Thus the bolt may be projected for engagement in the recess 7 as is clearly shown in Fig. 1, when the gate is in its normal closed position, and the bottom ends of the standards 18 are resting in the keeper block 9. By retracting the bolts from the depression 7, the free end of the gate may be lifted as shown in Fig. 2, at which time the free ends of the slat bars 20 will swing downwardly. These slat bars 20 balance the gate in either a raised, a lowered, or a normal horizontal position. Thus when the gate is raised as shown in Fig. 2, it clears the ground keeper 9 and any other obstacles in the path of the horizontal movement of the gate. Furthermore, it will be seen that when the gate is in open position, the free end thereof may be lowered to rest on the ground so that the gate will be prevented from swinging to a closed position.

It will also be apparent to those skilled in this art that this gate is useful in many other different ways than those explained by way of example herein. I am aware that there are gates with which levers and weights are used to keep the outer ends in an elevated position; but I do not know of any gate in which the plurality of longitudinally extending slat bars are utilized as weights and are swingable in coplanar relation with the general plane of the gate to act within the limits of the frame of the gate itself to function as counter-balancing means. A gate constructed in accordance with this invention is exceedingly compact and convenient, and affords easy operation, besides being thoroughly efficient and reliable.

The present embodiment of the invention has been disclosed in detail merely by way of example, since in actual practice it attains the features of advantage enumerated as desirable in the statement of the invention and the above description. It is apparent, however, that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. A gate including a pair of standards, bars pivotally connected to the standards, a plurality of slats pivoted to one standard and extending to the other standard, a pulley journaled at the upper end of said one standard, and a member trained over the pulley and attached at its ends to the lower portion of said other standard and to one of the slats, and means for attaching the slats together adjacent their free ends.

2. A gate structure of the class described including a support, a pair of vertical standards arranged in parallel spaced relation and hinged to the support, a pair of vertically extending spaced parallel standards at the free end of the gate, a pair of bars having their ends pivoted between the standards of each pair, a plurality of slats pivoted between the standards at the free end of the gate and having their ends movable between the standards at the hinged end of the gate, members pivotally connecting the slats together, a pulley journaled at the upper end of one of the hinged standards, and a member trained over said pulley and attached to the bottom end of one of the standards at the free end of the gate and to one of the slats.

3. A gate structure of the class described including a support, a pair of vertical standards arranged in parallel spaced relation hinged to the support, a pair of vertically extending spaced parallel standards at the free end of the gate, a pair of bars having their ends pivoted between the standards of each pair, a plurality of slats pivoted between the standards at the free end of the gate and having their ends movable between the standards at the hinged end of the gate, members pivotally connecting the slats together, a pulley journaled at the upper end of one of the hinged standards, a member trained over said pulley and attached to the bottom end of one of the standards at the free end of the gate and to one of the slats, said member being in the form of a pair of rods and a flexible element disposed therebetween and engaging the pulley.

4. A gate structure of the class described, including a support, a pair of vertical standards arranged in parallel spaced relation hinged to the support, a pair of vertically extending spaced parallel standards at the free end of the gate, a pair of bars having their ends pivoted between the standards of each pair, a plurality of slats pivoted between the standards at the free end of the gate and having their ends movable between the standards at the hinged end of the gate, members pivotally connecting the slats together, a pulley journaled at the upper end of one of the hinged standards, a member trained over said pulley and attached to the bottom end of one of the standards at the free end of the gate and to one of the slats, a pair of standards straddling the intermediate portions of the slats and pivoted thereto, and straddling the intermediate portions of the bars.

In testimony whereof I affix my signature.

AARON H. SENSENIG.